W. M. SCOTT.
ELECTRIC PROTECTION SYSTEM.
APPLICATION FILED FEB. 28, 1914.
1,118,064.
Patented Nov. 24, 1914.
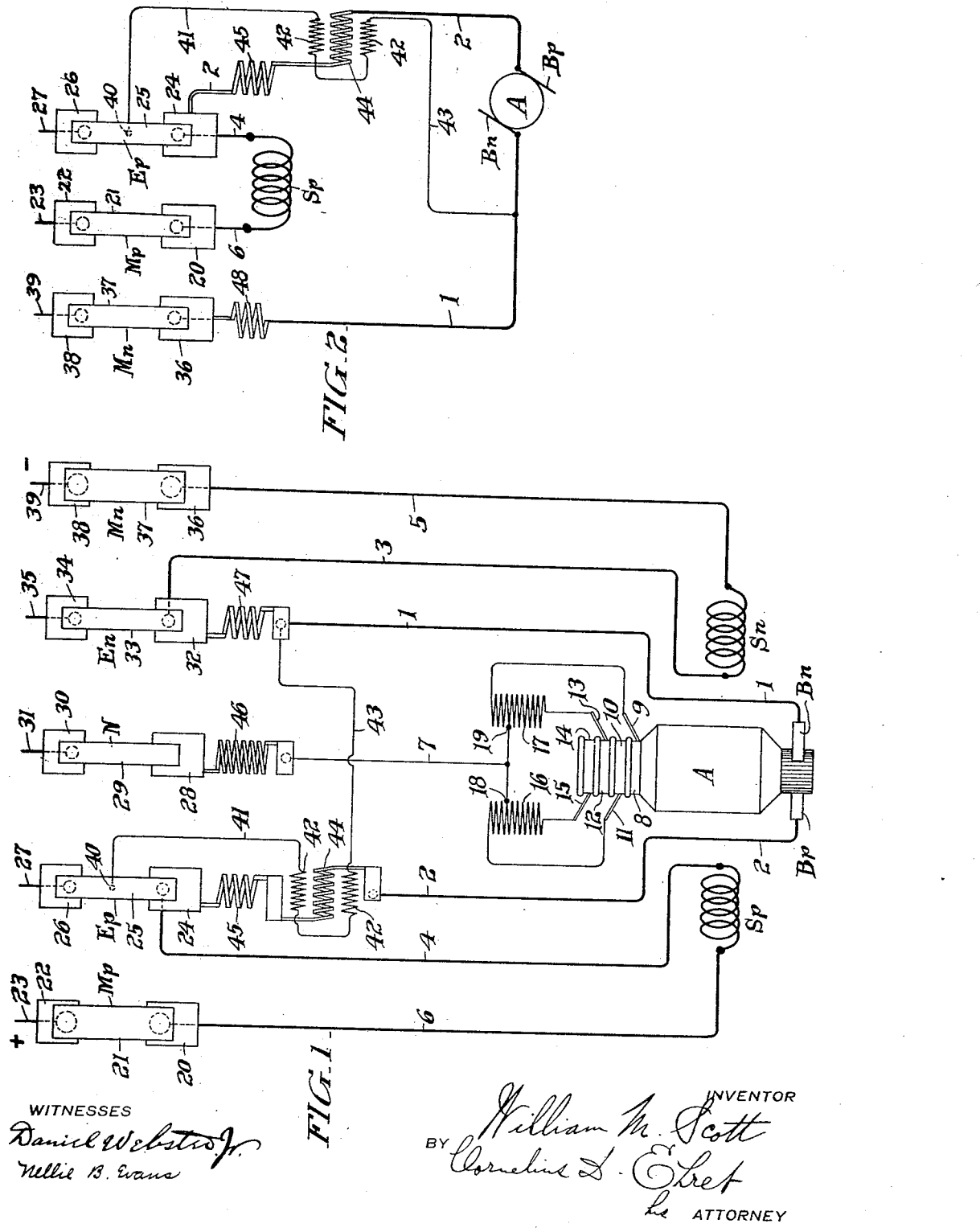

UNITED STATES PATENT OFFICE.

WILLIAM M. SCOTT, OF RADNOR, PENNSYLVANIA.

ELECTRIC PROTECTION SYSTEM.

1,118,064.  Specification of Letters Patent.  Patented Nov. 24, 1914.

Continuation of application Serial No. 685,971, filed March 25, 1912. This application filed February 28, 1914. Serial No. 821,652.

*To all whom it may concern:*

Be it known that I, WILLIAM M. SCOTT, a citizen of the United States, residing in Radnor, in the county of Delaware and State of Pennsylvania, have invented a new and useful Electric Protection System, of which the following is a specification.

My invention relates to an electric protective system, and more particularly to a system for the protection of a generator running in parallel with another generator or generators.

My invention resides in the combination with such a generator of a circuit breaker having a plurality of poles, including main and equalizer poles, together with a series tripping coil traversed by the true armature current as distinguished from the current that may flow in the main conductor leading to the distribution net-work. And more particularly my invention resides in the combination with a three-wire generator of a circuit breaker having main and equalizer poles and a series tripping coil so disposed that it shall be traversed by the true armature current as distinguished from the current in the main leading to the distribution net-work.

My invention resides in the features hereinafter described and claimed.

For an illustration of my invention reference is to be had to the accompanying drawing, in which:

Figure 1 is a diagram of circuits, switches, etc., employed to protect a three wire generator. Fig. 2 is a similar diagrammatic view illustrating the application of my invention to a two-wire generator.

In Fig. 1, at A is indicated the armature of a three-wire generator delivering current at 250 volts, for example, between the outside conductors 5 and 6, and one-half that voltage between neutral conductor 7 and either outside conductor 5 or 6. The armature A is provided, in addition to the commutator upon which bear the positive and negative brushes $Bp$ and $Bn$, respectively, with the four slip rings 8, 10, 12 and 14 upon which bear respectively the brushes 9, 11, 13 and 15. The slip rings 8 and 12 are connected to such points in the armature winding that there is delivered through them to the brushes 9 and 13 an alternating current which is passed through the choke coil or inductance 17; and the slip rings 10 and 14 are connected to such points in the armature winding that there is delivered through them and the brushes 11, 15 an alternating current which is passed through the choke coil or inductance 16. The alternating currents passing through inductances 16 and 17 are displaced in phase by 90°. At points 18 and 19 connections are made to the inductances or balance coils 16 and 17 respectively, these points 18 and 19 being at the same potential and constitute a neutral point, at half voltage, between brushes $Bp$ and $Bn$. Accordingly the neutral conductor 7 is connected to the balance coils 16 and 17 at 18 and 19. Other types of three wire generator are known to which my invention is applicable.

The shunt field winding of the generator is omitted for the sake of clearness. In this type of generator the series field winding is divided into halves, one-half for the positive side of the generator and one-half for the negative side of the generator, these series field windings being indicated respectively at $Sp$ and $Sn$.

The negative brush $Bn$ of the generator is connected through conductor 1 and overload tripping coil 47 with one terminal 32 of the negative equalizer breaker $En$. One terminal of the negative series field winding is connected to this same terminal 32 through conductor 3, and the other terminal of the series field winding is connected through conductor 5 with one terminal 36 of the negative main breaker $Mn$. The positive brush $Bp$ is connected through conductor 2 and through the current coils 44 and 45 with one terminal 24 of the positive equalizer breaker $Ep$. One terminal of the positive series field is connected with this terminal 24 through conductor 4, and the other terminal of the winding is connected through conductor 6 with one terminal 20 of the positive main breaker $Mp$. The neutral conductor 7 is connected through overload tripping coil 46 with the terminal 28 of the neutral breaker N.

The movable contact member 21 of the positive main breaker $Mp$ bridges contacts 20 and 22, the latter being connected to the positive main bus 23. Similarly the movable contact member 37 of the negative main breaker $Mn$ bridges terminals 36 and 38, the latter connected to the negative main bus 39. The movable contact member 25 of the positive equalizer breaker E*p* bridges terminals 24 and 26, the latter connected to the positive equalizer bus 27. Similarly the movable contact member 33 of the negative equalizer breaker E*n* bridges terminals 32 and 24, the latter connected to the negative equalizer bus 35. The movable contact member 29 of the neutral breaker N bridges terminals 28 and 30, the latter connected to the neutral bus 31.

The other generator or generators, running in parallel with the one illustrated in the drawing, is or are similarly connected through similar apparatus with the busses 23, 27, 31, 35 and 39. With busses 23, 31, and 39 the conductors leading to the consumption circuits are connected. The equalizer busses 27 and 35 simply connect the similar equalizer breakers of the generators running in parallel.

The movable contact members 21, 25, 29, 33 and 37 may be mechanically connected together, but insulated from each other, so that they may all open circuit simultaneously or all close circuit simultaneously. The neutral and equalizer breakers are provided with latches for restraining the breakers in closed position. These latches, or the latch actuators of these three breakers may be mechanically connected together so that when any one latch is actuated, all are actuated simultaneously, with the result that all five breakers or switches open simultaneously. Or a single latch may restrain all the contact members, and all the tripping devices control or act upon that latch. With either equalizer breaker, or with both, are associated series and shunt tripping coils for response to reverse energy flow. Such tripping coils are shown at 42 and 44 associated with the positive equalizer breaker E*p*. The current coil 44 is connected in series with the overload tripping coil 45 which may also trip the latch of this breaker. The shunt or potential coils 42 are connected between the negative armature conductor 1 and the positive armature conductor 2 through the bridging member 25 and the terminal 40. When the breakers open, the connection between terminal 40 and bridging member 25 is broken, thereby breaking the circuit through the potential coils 42. The neutral breaker N is provided with an overload tripping coil 46 and the negative equalizer breaker E*n* is provided with an overload tripping coil 47. The operation of the particular apparatus described is as follows: If the loads on the two sides of the three-wire system become unbalanced, current proportional to the unbalancing flows through the tripping coil 46 of the neutral breaker N. When this current attains a predetermined value the magnetic effect of coil 46 is sufficient to trip the neutral breaker N, and in consequence all the switches and breakers open simultaneously. Or upon the occurrence of excessive current flow through the armature A between the neutral conductor 7 and the positive side of the circuit the overload coil 45 will be energized sufficiently to trip the breakers; and similarly upon excessive current flow through the armature A between conductor 7 and the negative side of the circuit the overload coil 47 will trip all the breakers. Or in the case when the generator whose armature A is receiving current from the busses instead of supplying current thereto, that is, in the case of reversed energy flow, the coils 42 and 44 co-act to trip all the breakers. And it will be noted that when the main and equalizer poles of the circuit breaking apparatus are open the series field coil is completely isolated from the buses and the distribution net-work.

It will be noted that by associating the tripping coils 45 and 47 in the relation indicated with the equalizer breakers, these coils are traversed by the true armature current upon whose excess the breakers are to be tripped; while if these coils were connected in the main leads 6 and 5 they would not be traversed by all the current flowing in the armature but would, in some cases, be traversed by a current of different value, generally smaller, which might be flowing through the series fields due to their parallel connection with the series fields of the other generators running in parallel. And as to the reverse energy flow tripping coils, associated with either or both equalizer leads, the current coil of each reverse current tripping mechanism is traversed by the true armature current and not by some current of different value as might occur if the current coil of the reverse energy flow tripping mechanism were associated with either of the main leads 5 or 6.

The current passing from the generator illustrated through the other generator or generators running in parallel and flowing through conductors 5 and 6 is not a correct measure of the current carried by the armature which must be protected against excessive current flow. Therefore by connecting the overload coils 45 and 47 between the generator brushes and the positive and negative equalizer conductors, the breakers are caused to respond to the current actually flowing in the armature on either side of the neutral 7. Whatever the cause of the reversed energy flow into the generator, the largest portion of the reverse current will follow the path of least resistance into the armature, and this path of least resistance is through the equalizer leads, a lesser portion only entering the armature by way of the main leads 5 and 6. In consequence the association of the current coil 44 of a reverse energy flow tripping mechanism is, according to my invention, connected in an equalizer lead as 1 or 2 between the armature brush and the equalizer conductor.

It is apparent that according to my invention the connection of each series field winding between corresponding main and equalizer poles of the circuit breaker mechanism are so made that the total armature current passes through each of the two overload coils 45 and 47, regardless of the manner and proportion in which that current subsequently divides between main and equalizer leads. This arrangement I regard as of great importance in the protection of three-wire generators.

In Fig. 2 the same principle is applied to a two-wire generator adapted to run in parallel with another generator. Here, as in the case of Fig. 1, the positive brush B*p* connects by conductor 2 through the series tripping coil 44 of the reverse current tripping apparatus and the series overload tripping coil 45 with the terminal 24 of the equalizer pole of circuit breaker mechanism which may include the equalizer pole E*p*, the main positive pole M*p*, and the main negative pole M*n*. The equalizer pole comprises the movable contact member 25 adapted to bridge the contact terminals 24 and 26, with which latter connects the equalizer bus 27. The negative brush B*n* of the generator armature A connects by conductor 1 with the contact terminal 36 of the negative pole of the breaker, through the series tripping coil 48, if such is desired. The main negative pole comprises the movable contact member 37 bridging the contact terminals 36 and 38 with which latter connects the main negative bus 39. The main positive pole comprises the movable contact member 21 bridging the contact terminals 20 and 22, with which latter connects the main positive bus 23. The series field winding associated with the generator armature A is shown at S*p* and, as in Fig. 1, is connected between the contact terminals 20 and 24. The shunt field winding of the generator is omitted as in Fig. 1. The shunt or potential coils, 42, 42 of the reverse current tripping mechanism are connected, as in Fig. 1, between conductors 1 and the contact 40 associated with movable contact member 25.

As in Fig. 1, the series tripping coils 44 and 45 are traversed by the true armature current as distinguished from the current in the main 23. And as in Fig. 1, the current through the armature by way of the equalizer bus may be greater than the current in the main 23 and it is to this true armature current that circuit breaker mechanism responds.

This application is a continuation of my application Serial Number 685,971, filed March 25, 1912.

What I claim is:

1. The combination with a three-wire generator, of main and equalizer conductors, positive and negative series field windings connected between main and equalizer conductors, circuit breaker mechanism comprising main and equalizer poles, and a tripping coil therefor connected in series between one terminal of the armature of said generator and the junction of a series field winding with an equalizer conductor.

2. The combination with a three-wire generator, of main and equalizer conductors, positive and negative series field windings, main and equalizer busses, circuit breaker mechanism comprising main and equalizer poles for connecting said main and equalizer conductors respectively with said main and equalizer busses, a series field winding connected between the main and equalizer conductor terminals of said poles, and a tripping coil connected between one terminal of the armature of said generator and said equalizer conductor terminal of said equalizer pole.

3. The combination with a three-wire generator, of main and equalizer conductors, main and equalizer busses, circuit breaker mechanism comprising main and equalizer poles adapted to connect said main and equalizer conductors with said main and equalizer busses, a series field winding connected between a main conductor and an equalizer conductor, and tripping mechanism comprising a tripping coil connected in series between one terminal of the armature of said generator and the junction between said main and equalizer conductors, and a potential tripping coil coöperating with said tripping coil and connected across a circuit of said generator.

4. The combination with a three-wire generator, of main and equalizer conductors, main and equalizer busses, circuit breaker mechanism comprising main and equalizer poles adapted to connect said main and equalizer conductors with said main and equalizer busses, a series field winding connected between a main conductor and equalizer conductor, and tripping mechanism comprising a tripping coil connected in series between one terminal of the armature of said generator and the junction between said main and equalizer conductors, and a potential tripping coil coöperating with said tripping coil and connected across the terminals of said armature.

5. The combination with a three-wire generator, of positive and negative main conductors, positive and negative equalizer conductors, positive and negative main busses, positive and negative equalizer busses, circuit breaker mechanism comprising positive and negative main poles and positive and negative equalizer poles for connecting said conductors to said busses, positive and negative series field windings connected respectively between the positive main and equalizer conductors and the negative main and equalizer conductors, and a tripping coil in series with each equalizer conductor between each armature terminal and each series field winding.

6. The combination with a three-wire generator, of positive and negative main conductors, positive and negative equalizer conductors, a neutral conductor, circuit breaker mechanism comprising positive and negative main poles, positive and negative equalizer poles and a neutral pole, a series field winding between each main conductor and equalizer conductor, tripping coils in series between the armature terminals and the junctions of said series field windings with said equalizer poles, and a tripping coil in series with said neutral pole.

7. The combination with a three-wire generator, of positive and negative main conductors, positive and negative equalizer conductors, a neutral conductor, circuit breaker mechanism comprising positive and negative main poles, positive and negative equalizer poles and a neutral pole, a series field winding between each main and equalizer conductor, tripping coils in series between the armature terminals and the junctions of said series field windings with said equalizer poles, a tripping coil in series with the neutral conductor, and a reverse current tripping mechanism comprising a series coil connected between an armature terminal and the junction of one of said series field windings with an equalizer conductor, and a potential winding shunted across a circuit of said generator.

8. The combination with a generator, of main and equalizer busses, main and equalizer conductors connected to the same terminal of the armature of said generator, a generator field coil connected between a main conductor and said armature terminal, circuit breaking mechanism for connecting said conductors with said busses, and tripping mechanism therefor comprising electro-magnetic means subjected to the combined effects of the currents in said main and equalizer conductors.

9. The combination with a generator, of main and equalizer busses, main and equalizer conductors connected to the same terminal of the armature of said generator, a series field winding of said generator connected in series between said terminal of said armature and said main conductor, circuit breaking mechanism for connecting said conductors with said busses, and tripping mechanism comprising electro-magnetic means subjected to the total current flowing through said terminal of said armature and said main and equalizer conductors.

10. The combination with a generator, of main and equalizer busses, main and equalizer conductors, circuit breaking mechanism for connecting said conductors with said busses, electro-responsive means controlling said circuit breaking mechanism, a series field winding, and connections from a terminal of the armature of said generator through said electro-responsive means and said series field winding to said main conductor and through said electro-responsive means to said equalizer conductor.

11. The combination with a three-wire generator, of positive and negative main conductors, positive and negative equalizer conductors, a neutral conductor, circuit breaker mechanism comprising positive and negative main poles and positive and negative equalizer poles, a series field winding of said generator connected between each main conductor and equalizer conductor, and tripping coils for said circuit breaker mechanism connected in series between the armature terminals of said generator and the junctions of said series field windings with said equalizer poles, and a tripping coil in series with said neutral conductor.

12. The combination with a three-wire generator, of positive and negative main conductors, positive and negative equalizer conductors, a neutral conductor, circuit breaker mechanism comprising positive and negative main poles and positive and negative equalizer poles, a series field winding between each main conductor and equalizer conductor, tripping coils for said circuit breaker mechanism in series between the armature terminals and the junctions of said series field windings with said equalizer poles, a tripping coil in series with said neutral conductor, and a reverse current tripping mechanism comprising a series coil connected between an armature terminal and the junction of one of said series field windings with an equalizer conductor, and a potential winding shunted across a circuit of said generator.

In testimony whereof I have hereunto affixed my signature in the presence of two subscribing witnesses.

WILLIAM M. SCOTT.

Witnesses:
CAROLYNE H. V. HEENAN,
M. C. GILLESPIE.

Copies of this patent may be obtained for five cents each, by addressing the "Commissioner of Patents, Washington, D. C."